United States Patent [19]

Immler

[11] 4,249,235
[45] Feb. 3, 1981

[54] CIRCUIT ARRANGEMENT FOR INEXPENSIVE PRODUCTION OF THREE-PHASE CURRENT FROM DC CURRENT

[75] Inventor: Josef Immler, Puchheim, Fed. Rep. of Germany

[73] Assignee: Siemens Aktiengesellschaft, Berlin & Munich, Fed. Rep. of Germany

[21] Appl. No.: 15,049

[22] Filed: Feb. 26, 1979

[30] Foreign Application Priority Data

Mar. 8, 1978 [DE] Fed. Rep. of Germany ....... 2810068

[51] Int. Cl.³ .......................................... H02M 7/44
[52] U.S. Cl. .................................... 363/2; 363/98; 363/132
[58] Field of Search .................... 363/2, 4, 16–17, 363/24, 96–98, 131–137, 139

[56] References Cited

U.S. PATENT DOCUMENTS

| | | | |
|---|---|---|---|
| 2,731,590 | 1/1956 | Smith | 363/2 X |
| 3,278,825 | 10/1966 | Haas, Jr. | 363/2 |
| 3,354,376 | 11/1967 | Corey et al. | 363/2 |
| 3,694,718 | 9/1972 | Graf et al. | 363/137 X |
| 3,864,619 | 2/1975 | Tanaka et al. | 363/135 |

FOREIGN PATENT DOCUMENTS

| | | | |
|---|---|---|---|
| 2423601 | 11/1975 | Fed. Rep. of Germany | 363/131 |
| 2536371 | 2/1977 | Fed. Rep. of Germany | 363/132 |

*Primary Examiner*—William M. Shoop
*Assistant Examiner*—Peter S. Wong
*Attorney, Agent, or Firm*—Hill, Van Santen, Steadman, Chiara & Simpson

[57] ABSTRACT

A circuit arrangement for inexpensive production of three-phase current from dc current contains two dc voltage sources connected in series, the connection point of which is selected as reference voltage. A chopper circuit is provided which is arranged in parallel to the series circuit of the dc voltage sources and which produces two ac voltages phase-displaced by 60° from the dc current provided by the dc voltage sources.

3 Claims, 5 Drawing Figures

CIRCUIT ARRANGEMENT FOR INEXPENSIVE PRODUCTION OF THREE-PHASE CURRENT FROM DC CURRENT

BACKGROUND OF THE INVENTION

1. Field of the Invention

The present invention relates to an arrangement for inexpensive production of three-phase current from dc current.

2. Description of the Prior Art

Circuit arrangements for producing three-phase current from dc current are already known in the art. For example, one may refer to the publication "Electronics", 1976, Vol. 9, p. 63. The circuit arrangement illustrated therein employes a chopper circuit consisting of transistors in order to produce three-phase from dc current. An ac current is produced for each of the three phases of the three-phase current. The chopper circuit therefore comprises three series circuits each having two transistors arranged in parallel to one another. The connection point of the two transistors of a series circuit, respectively, forms the output for a ac current assigned to a phase. The two transistors of each series circuit are actuated in a push-pull manner. The control of the transistors of the various series circuits is such that three ac currents of the three-phase current appear phase-displaced by 120°. Such actuation circuits are also well known in the art. For example, one may refer to the publication "Electronics", 1976, Vol. 11, pp. 143-144, and the publication "Electronics", 1977, Vol. 7, p. 70. Therefore, three transistor chopper circuits are necessary for the known circuit arrangement in order to produce three-phase current from dc current.

SUMMARY OF THE INVENTION

The object of the present invention is to provide a circuit arrangement for producing three-phase current from dc current, whose expense is lower vis-a-vis known circuit arrangements. This object is achieved in that two dc voltage sources are connected in series and have a connection point which is selected as a reference voltage and that a chopper circuit is provided which is arranged in parallel to the series circuit of the dc voltage source and which produces two ac currents which are phase-displaced by 60° from the dc current provided by the dc current sources.

The chopper circuit advantageously comprises two switch arrangements connected in parallel. Each switch arrangement is designed to include two switches connected in series. The connection point of the dc current sources forms the output of the first phase, while the connection point of the switches of the first switch arrangement forms the output for the second phase and the connection point of the switches of a second switch arrangement forms the output of the third phase. Additionally, an actuation circuit is provided which drives the switches of each switch arrangement in push-pull and controls the switches of the two switch arrangements assigned to one another such that the ac voltages emitted at the outputs of the switch arrangement are phase-displaced by 60°.

The individual switches of the switch arrangements can comprise, for example, controlled semiconductor switch elements such as, for example, transistors, thyristors, etc.

The advantage of circuit arrangement constructed in accordance with the present invention is that only two switch arrangements (vis-a-vis the three switch arrangements in the prior art) are required for producing the three-phase current.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
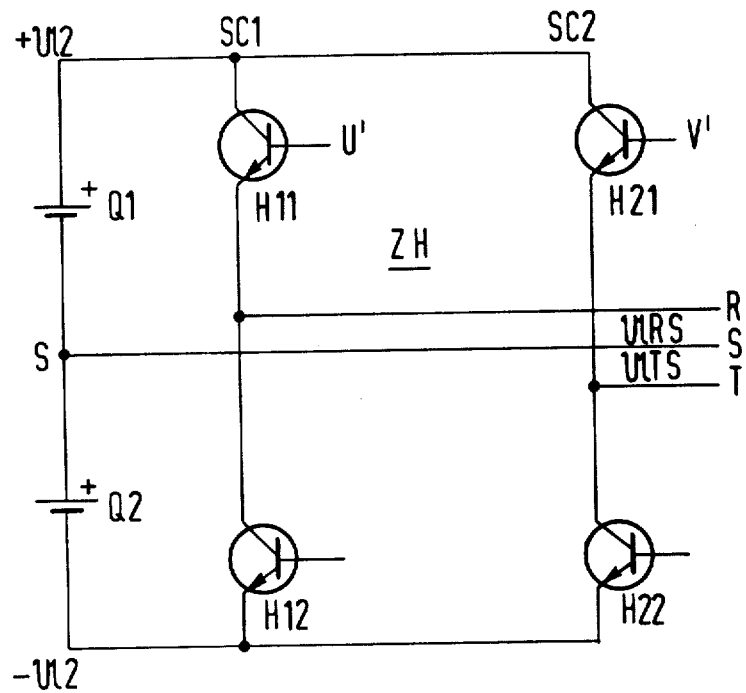
FIG. 1 is a schematic circuit diagram of a switch arrangement constructed in accordance with the present invention.

Referring to FIG. 1, an embodiment of the invention is illustrated for providing two ac voltages which are produced in a 60° phase displacement. This arrangement also contains a chopper circuit.

The circuit arrangement of FIG. 1 comprises two dc voltage sources Q1 and Q2 which are connected in series. The junction of the two dc voltage sources Q1 and Q2 forms an output of the circuit arrangement, which output is referenced S. Two voltage sources are not necessary, in that it is possible to subdivide a single dc voltage source for this purpose. A pair of voltages $+U2$ and $-U2$ exist at the opposite ends of the dc voltage sources Q1 and Q2.

A chopper circuit ZH is connected in parallel to the series circuit of thw two dc voltage sources Q1 and Q2. The chopper circuit comprises two series-connected circuits SC1 and SC2. The series circuits SC1 and SC2 respectively comprise a pair of transistor switches H11 and H12 and H21, H22. The series circuits SC1 and SC2 are connected in parallel and lie in parallel to the series circuit which comprises the voltage sources Q1 and Q2. The junction point of the switches H11 and H12 forms an output R, while the junction point of the switches H21 and H22 forms an output T. The switches, for example, can be realized as transistors, whose collector-emitter paths are connected in series as illustrated in FIG. 1.

Figure 5:
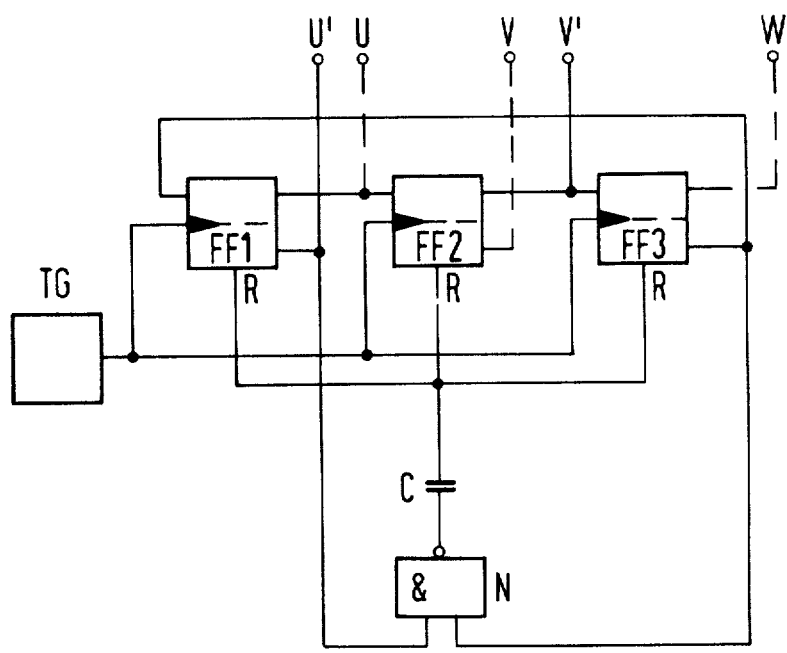
FIG. 5 is a schematic circuit diagram illustrating a trigger circuit for the switches of the chopper circuit of FIG. 1.

The switches H11 and H12 of the series circuit SC1, and the switches H21 and H22 of the series circuit SC2 are actuated in a push-pull manner. This means that if one switch, for example, the switch H11, of a series circuit is conductive, the other switch, for example, H12 of the same series circuit is blocked. The transistors of the two series circuits SC1 and SC2, for example, H11 and H21 of H12 and H22 assigned to one another, are now actuated such that the ac voltage URS provided at the output R is phase-displaced by 60° vis-a-vis the ac voltage UTS provided at the output T. A corresponding actuation circuit is illustrated in FIG. 5.

Figure 2:
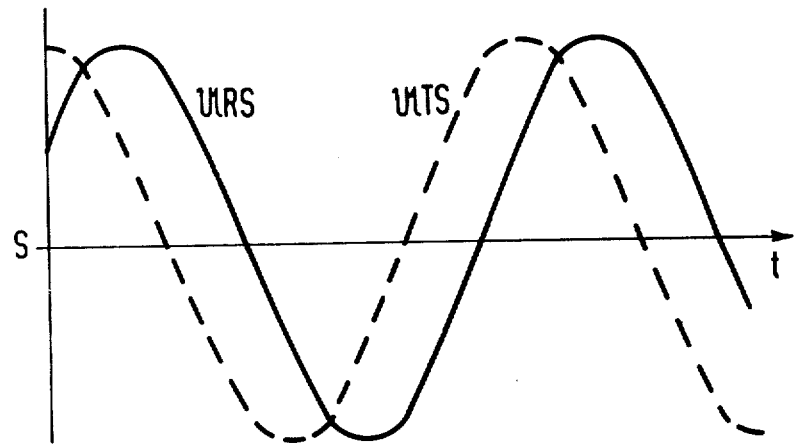
FIG. 2 is a graphic illustration of the ac current produced by the circuit arrangement illustrated in FIG. 1.

The voltages URS and UTS provided at the outputs R and T are illustrated in FIG. 2. The voltage URS is illustrated in solid lines, while the voltage UTS is illustrated in broken line. In FIG. 2, the voltage plotted with respect to time t. As the output S is selected as a reference point for the voltages, the zero point of the coordinate intersection can be referenced S.

Figure 3:
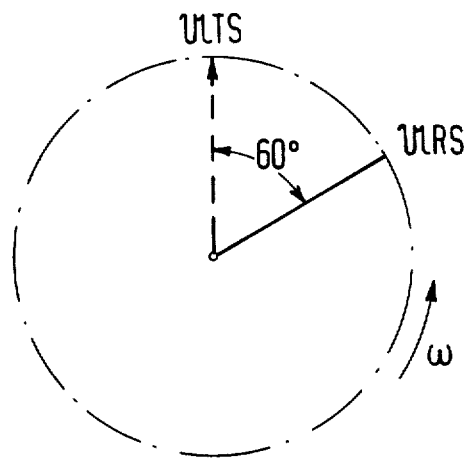
FIG. 3 is a rotational diagram illustrating phase relationships.
Figure 4:
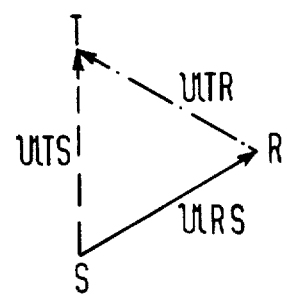
FIG. 4 is a vector voltage triangle.

From FIG. 2 it will be appreciated that two ac voltages, phase-displaced by 60°, are provided at the outputs R and T. However, the ac voltages assigned to the three phases of a three-phase current can be derived from these two ac voltages. The diagram of FIG. 3 and the voltage triangle of FIG. 4 illustrate this very clearly. In FIG. 3, two arrows which are phase-displaced by 60° are drawn for the voltages URS and UTS, which arrows continuously rotate at the angler speed ω. The center point of the diagram is referenced S. If the voltage triangle is developed from this diagram in a known manner, the representation of FIG. 4 results. This voltage triangle is composed of the voltages of URS and UTS. However, the voltage triangle illustrated in FIG. 4 corresponds with the voltage triangle for three-phased ac current, in which the individual phases are phase-displaced by 120°. Thereby, a three-phase current can be produced with only two switch arrangements with the aid of the circuit arrangement illustrated in FIG. 1, which three-phase current corresponds with the three-phase current formed with three switch in conventional circuits known in the art.

In order to facilitate the production of ac currents which are phase-displaced by 60° by means of the circuit arrangement illustrated in FIG. 1, a trigger or actuation circuit must be provided by means of which the base connections of the transistors H11–H22 are correspondingly actuated. Such an actuation circuit is illustrated in FIG. 5. For the development of this actuation circuit, one thereby proceeds from the above-cited publications "Electronics", 1976, Vol. 11, pp. 143 and "Electronics", 1977, Vol. 7, p. 70.

The transistors of the series circuits SC1 and SC2 of the chopper circuit ZH must be actuated such that two ac voltages occur at the outputs R and T as illustrated in FIG. 2. For this purpose, an assignment table can be complied as follows.

TABLE

|   | u' | v' |
|---|----|----|
| 1 | 0  | 1  |
| 2 | 0  | 0  |
| 3 | 0  | 0  |
| 4 | 1  | 0  |
| 5 | 1  | 1  |
| 6 | 1  | 1  | where u' indicates the voltage which is fed to the base of the transistor H11 of the first series circuit SC1, and v' represents the voltage which is fed to the transistor H21 of the series circuit SC2. As already stated above, the voltages, inverted in comparison with the transistors H11, H21, respectively, are fed to the transistors H12, H22, respectively. From the above Table, it is readily apparent that the actuation circuit must carry out six steps in cyclical sequence and produce the values for u' and v' set forth in the Table. If the Table provides a "zero", this means a low voltage, whereas if the Table provides a "1", a high voltage is represented.

The circuit arrangement illustrated in FIG. 5 is designed such that it produces the values disclosed in the Table for the voltages u' and v'. It contains a pulse generator, for example, a multivibrator TG. The output of the pulse generator TG is connected to three flip-flops FF1, FF2 and FF3. Each of the flip-flops FF1, FF2 and FF3 has a preparation input. For this purpose, the preparation input of the flip-flop FF2 is connected to the output of the flip-flop FF1, the preparation input of the flip-flop FF3 is connected to the output of the flip-flop FF2 and the preparation input of the flip-flop FF1 is connected to the inverse output of the flip-flop FF3. The voltage u' can therefore by tapped from the negating output of the flip-flop FF1, while the voltage v' can be tapped from the non-negating output of the flip-flop FF2. A NAND element N and a capacitor C are provided for resetting the flip-flops FF1, FF2, and FF3. The operating characteristics of this circuit are apparent from the publication "Electronics", 1977, Vol. 7, p. 70, so that no further discussion thereof is necessary herein. The outputs u, v, w illustrated in broken lines can be used as actuating a known circuit arrangement which has three switch arrangements.

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. A circuit arrangement for producing three-phase current from dc current, comprising:
   a pair of dc voltage sources connected in series at a junction point to provide a reference voltage at said reference point; and
   a chopper circuit connected in parallel with said series connected sources and operable to produce, from the dc voltage of said sources, two ac voltages phase-displaced 60° from each other.

2. The arrangement of claim 1, wherein:
   said chopper circuit comprises two switch arrangements connected in parallel,
   each of said switch arrangements comprising two series connected switches each providing respective junction for a respective ac phase and an an actuation circuit connected to said switches for operating said switches in a push-pull manner.

3. The arrangement of claim 2, wherein each said switch arrangements comprises controlled semiconductor switches.

* * * * *